United States Patent
Kashihara et al.

(10) Patent No.: US 10,092,886 B2
(45) Date of Patent: Oct. 9, 2018

(54) FLUID MIXER AND HEAT EXCHANGE SYSTEM USING SAME

(71) Applicant: KAWASAKI JUKOGYO KABUSHIKI KAISHA, Kobe-shi, Hyogo (JP)

(72) Inventors: Hiroyuki Kashihara, Kobe (JP); Yasufumi Hosokawa, Kakogawa (JP); Yoshihiro Yamasaki, Kobe (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 751 days.

(21) Appl. No.: 14/245,158

(22) Filed: Apr. 4, 2014

(65) Prior Publication Data

US 2014/0219048 A1 Aug. 7, 2014

Related U.S. Application Data (63) Continuation of application No. PCT/JP2012/071279, filed on Aug. 23, 2012.

(30) Foreign Application Priority Data

Oct. 11, 2011 (JP) ................................ 2011-223820

(51) Int. Cl.
*B01F 5/04* (2006.01)
*B01F 3/02* (2006.01)
(Continued)

(52) U.S. Cl.
CPC .............. *B01F 5/0403* (2013.01); *B01F 3/02* (2013.01); *B01F 5/0471* (2013.01);
(Continued)

(58) Field of Classification Search
CPC ........................................ B01F 5/047–5/0493
(Continued)

(56) References Cited

U.S. PATENT DOCUMENTS

| | | | | |
|---|---|---|---|---|
| 1,454,196 A | * | 5/1923 | Trood | B01F 5/0415 48/189.4 |
| 1,466,006 A | * | 8/1923 | Trood | B01F 5/0415 48/189.4 |

(Continued)

FOREIGN PATENT DOCUMENTS

| | | | | |
|---|---|---|---|---|
| CH | 676628 A5 | * | 2/1991 | ............ B01F 5/0403 |
| CN | 2629817 Y | | 8/2004 | |

(Continued)

OTHER PUBLICATIONS

International Search Report of PCT/JP2012/071279 dated Oct. 16, 2012.
(Continued)

*Primary Examiner* — Charles Cooley
(74) *Attorney, Agent, or Firm* — Sughrue Mion, PLLC (57) ABSTRACT

A fluid mixing device includes a hollow tubular main body (41) to mix an exhaust gas (G4) and a warming gas (G5) within it, a first inflow port (43) provided in an upstream end portion of the main body (41) and through which the exhaust gas (G4) flows, a mixing promotion body (38) of a tubular shape disposed inside the main body (41) and having a longitudinal axis (C1) extending in a direction conforming to a direction of flow of the exhaust gas (G4), and a second inflow port (45) provided in a peripheral wall of the main body (41) and through which the warming gas (G5) flows towards an outer peripheral wall of the mixing promotion body (38). The exhaust gas (G4) flows outside and inside the mixing promotion body (38).

12 Claims, 7 Drawing Sheets

(51) Int. Cl.
  *B01F 5/06* (2006.01)
  *F02C 6/18* (2006.01)
  *F02C 7/10* (2006.01)
  *F28D 21/00* (2006.01)
  *F28F 13/12* (2006.01)

(52) U.S. Cl.
  CPC .......... *B01F 5/0473* (2013.01); *B01F 5/0659* (2013.01); *F02C 6/18* (2013.01); *F02C 7/10* (2013.01); *F28D 21/001* (2013.01); *F28F 13/125* (2013.01); *F05B 2220/60* (2013.01); *F05D 2260/2212* (2013.01)

(58) Field of Classification Search
  USPC ......... 366/163.1, 167.1, 173.1, 174.1, 175.2, 366/176.1, 181.8, 182.4, 182.2, 337, 366/163.2; 137/889, 892–896
  See application file for complete search history.

(56) References Cited

U.S. PATENT DOCUMENTS

| | | | | |
|---|---|---|---|---|
| 1,672,209 | A * | 6/1928 | Goldberg | F02N 99/008 123/179.9 |
| 1,678,225 | A * | 7/1928 | Kincade | B01F 5/0415 196/46 |
| 1,903,429 | A * | 4/1933 | Merchant | B01F 5/0403 261/75 |
| 2,831,754 | A * | 4/1958 | Manka | B01D 11/0473 239/404 |
| 3,304,564 | A * | 2/1967 | Green | A01K 63/04 137/205.5 |
| 3,643,688 | A * | 2/1972 | Meinert | B67D 1/0016 137/556 |
| 4,296,779 | A * | 10/1981 | Smick | F28F 13/12 138/38 |
| 4,721,126 | A * | 1/1988 | Horii | B65G 53/58 137/1 |
| 4,993,495 | A * | 2/1991 | Burchert | B01F 5/0403 169/14 |
| 5,492,409 | A * | 2/1996 | Karlsson | B01F 3/0861 366/338 |
| 5,743,637 | A * | 4/1998 | Ogier | B01F 3/12 |
| 6,453,926 | B1 * | 9/2002 | Baker | B01F 5/0473 |
| 7,029,165 | B2 * | 4/2006 | Allen | B01F 5/0475 366/163.2 |
| 7,416,404 | B2 * | 8/2008 | Chan | B01F 5/0453 |
| 8,033,714 | B2 | 10/2011 | Nishioka et al. | |
| 9,885,318 | B2 * | 2/2018 | Green | F02M 21/0218 |
| 9,975,094 | B2 * | 5/2018 | Gillis | B01F 5/0485 |
| 2003/0024583 | A1 * | 2/2003 | Baker | B01F 5/0473 137/890 |
| 2006/0187751 | A1 | 8/2006 | Lepine et al. | |
| 2006/0245296 | A1 * | 11/2006 | Nishioka | B01D 53/8631 366/174.1 |
| 2007/0144158 | A1 * | 6/2007 | Girard | F01N 3/2892 60/324 |
| 2014/0219048 | A1 * | 8/2014 | Kashihara | B01F 3/02 366/177.1 |

FOREIGN PATENT DOCUMENTS

| | | |
|---|---|---|
| JP | 53-72273 U | 6/1978 |
| JP | 60-46117 U | 4/1985 |
| JP | 04-048921 A | 2/1992 |
| JP | 2002-136855 A | 5/2002 |
| JP | 2003-126667 A | 5/2003 |
| JP | 2006-326571 A | 12/2006 |
| JP | 2007-500074 A | 1/2007 |
| JP | 2008-049306 A | 3/2008 |
| JP | 2010-149062 A | 7/2010 |
| RU | 2056920 C1 | 3/1996 |
| SU | 394073 A1 | 8/1973 |
| SU | 882571 A1 * | 11/1981 ........... B01F 5/0473 |
| SU | 1607916 A1 | 11/1990 |

OTHER PUBLICATIONS

English translation of the International Preliminary Report on Patentability for PCT/JP2012/071279, dated Apr. 24, 2014.
Communication dated Jul. 4, 2014, from the Ukrainian Patent Office in counterpart Ukrainian Patent Application No. a201404938.
Communication dated Mar. 23, 2015 from the Australian Patent Office in counterpart application No. 2012321964.
Communication dated Mar. 18, 2015 from the State Intellectual Property Office of the P.R.C. in counterpart application No. 201280049513.0.
Communication dated Nov. 4, 2014 from the Japanese Patent Office in counterpart application No. 2011-223820.
Communication dated Aug. 4, 2015 from the Russian Patent Office in counterpart application No. 2014118531.
English Abstract of previously cited SU 394073 A1, Aug. 1973.
Decision of Grant dated Feb. 12, 2016 from the Russian Patent Office issued in corresponding Application No. 2014118531.
Communication dated Nov. 30, 2015 from the Russian Patent Office in counterpart application No. 2014118531.

* cited by examiner

PRIOR ART

Fig. 9

PRIOR ART

FLUID MIXER AND HEAT EXCHANGE SYSTEM USING SAME

CROSS REFERENCE TO THE RELATED APPLICATION

This application is a continuation application, under 35 U.S.C. § 111(a) of international application No. PCT/JP2012/071279, filed Aug. 23, 2012, which claims priority to Japanese patent application No. 2011-223820, filed Oct. 11, 2011, the entire disclosure of which is herein incorporated by reference as a part of this application.

BACKGROUND OF THE INVENTION (Field of the Invention)

The present invention relates to a fluid mixing device for uniformly mixing two dissimilar fluids such as, for example, a high temperature fluid and a low temperature fluid.

(Description of Related Art)

In an apparatus for mixing a plurality of fluids together, it is desirable that the temperature distribution and the distribution of gas concentrations after the mixing are uniform. For example, where a turbine or a heat exchanger is disposed downstream of the mixing device, unless the temperature distribution of the mixed gas is uniform, stresses induced by uneven thermal strains occur in turbine blades and/or heat transmitting tubes and, as a result, the life of the turbine and/or the heat transmitting tube may be shortened. The efficiency of the machinery is also lowered.

Accordingly, in order to promote the mixing, a structure, in which ribs are provided in a field of fluid flow to facilitate the turbulent flow, and a structure, in which a flow is forcibly deflected to combine two fluid flows, have been known in the art. (See, for example, the patent document 1 listed below.) In those structures, the pressure loss of a tubing is large, the structure is complicated and the cost of manufacture increases accordingly. Where a high temperature fluid is used, a component part that contacts the high temperature fluid is required to have a heat resistance and, accordingly, the cost of manufacture further increases. Also, another suggestion has been made (as disclosed in the patent document 2 listed below) in which respective tubes for the flow of two fluids are connected together in a T-shaped fashion so that those two fluids may be mixed together with a simple structure.

PRIOR ART LITERATURE

Patent Document 1 JP Laid-open Patent Publication No. 2008-049306

Patent Document 2 JP Laid-open Patent Publication No. 2002-136855

It has been found that the fluid mixing device disclosed in the patent document 2 referred to above, although simple in structure, is incapable of providing a sufficiently uniformly mixed condition because the two fluids meet at right angles.

SUMMARY OF THE INVENTION

Accordingly, the present invention has been devised to provide a fluid mixing device which is simple in structure, but is capable of accomplishing a uniform mixing accompanied by the pressure loss being suppressed.

In order to accomplish the foregoing object of the present invention, there is provided, in accordance with the present invention, a fluid mixing device which includes a hollow tubular main body to mix first and second fluids within it, a first inflow port provided in an upstream end portion of the main body and through which the first fluid flows, a mixing promotion body of a tubular shape disposed inside the main body and having a longitudinal axis extending in a direction conforming to a direction of flow of the first fluid, and a second inflow port provided in a peripheral wall of the main body and through which the second fluid flows towards an outer peripheral wall of the mixing promotion body.

According to the present invention, the mixing promotion body having the longitudinal axis extending in a direction conforming to the direction of flow of the first fluid is disposed inside the main body and, therefore, the second fluid is introduced so as to flow towards the outer peripheral surface of the mixing promotion body. Therefore, the second fluid, after having impinged against the outer peripheral surface of the mixing promotion body, flows around the entire area circumferentially of the mixing promotion body and, hence, the first and second fluids are sufficiently mixed together in the outside of the mixing promotion body. The second fluid, after having been mixed with the first fluid flowing through the outside of the mixing promotion body, is again mixed, at a location downstream of the mixing promotion body, with the first fluid having flown the inside of the mixing promotion body, thus facilitating the mixing of the first and second fluids together. Also, since the first fluid flows in a direction conforming to the longitudinal axis of the mixing promotion body of a tubular shape, the pressure loss of the first fluid can be suppressed. In addition, since the mixing promotion body is disposed inside the main body and the second inflow port is merely disposed in the main body so that the second fluid can flow toward the mixing promotion body through the second inflow port, the structure is simple.

In a preferred embodiment of the present invention, the mixing promotion body may be disposed in substantially coaxial with the main body. According to this feature, regardless of the position at which the second inflow port is defined in a direction circumferentially of the main body, the distance between the second inflow port and the mixing promotion body becomes constant and, therefore, the accuracy is no longer required in positional relation between the second inflow port and the mixing promotion body. Accordingly, the manufacture is rendered to be easy.

In another preferred embodiment of the present invention, the fluid mixing device may further include a first tubing and a second tubing. The first tubing forms the main body whereas the second tubing is fluid connected with the first tubing so as to lie at right angle to the first tubing. This second tubing is used to supply the second fluid therethrough to the second inflow port. According to this structural feature, the second fluid impinges against the mixing promotion body in a direction perpendicular to the longitudinal axis of such mixing promotion body and, therefore, the second fluid can flow around an entire outer peripheral surface of the mixing promotion body to allow the mixing between the first and second fluids to be further promoted.

In a further preferred embodiment of the present invention, the fluid mixing device may further includes a first tubing forming the main body is fluid connected with a second tubing to supply the second fluid to the second inflow port. The second tubing has an end edge at that joint and the joint is disposed in flush with or radially outwardly of an inner peripheral surface of the first tubing. According to this structural feature, owning to the second tubing, the flow of the first fluid flowing through the first tubing is no longer hampered and the pressure loss of the tubing can be further suppressed.

In a yet preferred embodiment of the present invention, the first fluid may be of a temperature lower than the second fluid. Since the first fluid is lower in temperature than the second fluid, the entire surface of the mixing promotion body can be cooled by the first fluid and, therefore, there is no need to employ an extra structure designed specifically to avoid the overheating of the mixing promotion body.

In a yet further preferred embodiment of the present invention, a downstream portion of the main body may be defined by a flared body having its passage surface area that increases in a downstream direction. According to this structural feature, the mixed fluid can be diffused by the flared body and, therefore, the mixing can be further promoted.

The present invention also provides a heat exchange system in which the fluid mixing device of the kind designed also according to the present invention and discussed above is disposed upstream of a heat exchanger. According to this second aspect of the present invention, since the mixed fluid is introduced into the heat exchanger after the two fluids have been sufficiently mixed together by the fluid mixing device, the temperature distribution in the section perpendicular to the flow of the mixed fluid is uniformized and, consequently, the heat exchange efficiency increased.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Hereinafter, preferred embodiments of the present invention will be described in detail with reference to the accompany drawings.

Figure 1:
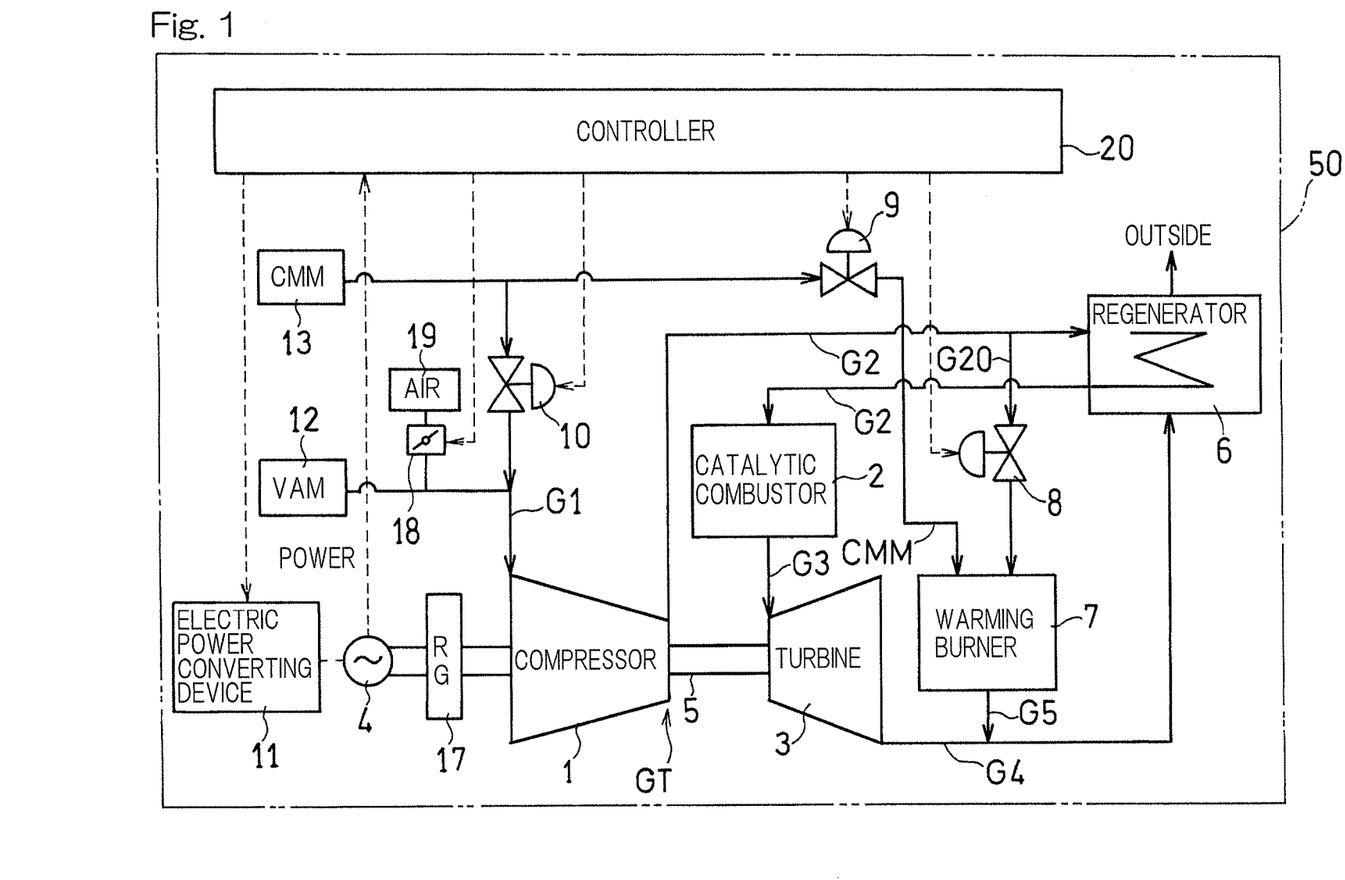
FIG. 1 is a block diagram showing a leaned fuel intake type gas turbine system utilizing a fluid mixer designed according to a first preferred embodiment of the present invention.

In particular, FIG. 1 illustrates a schematic structural diagram of a leaned fuel intake type gas turbine system utilizing a fluid mixer designed in accordance with a first preferred embodiment of the present invention. The gas turbine system includes a gas turbine engine GT which in turn includes a compressor 1, a catalytic combustor 2 utilizing a catalyst such as, for example, platinum or palladium, and a turbine 3. By an output of the gas turbine engine GT, a rotating machine 4, which serves as a power generator and a starter, is driven.

A working gas G1 used in this gas turbine engine GT may be a low calorie gas such as, for example, a VAM (Ventilation Air Methane) medium, produced in a coal mine or a CMM (Coal Mine Methane) medium having a higher concentration of combustible component (methane) than that of the VAM medium, in which air and fuel (combustible component) are mixed together. The working gas G1 is compressed by the compressor 1 and the resultant high pressure, compressed gas G2 is in turn supplied to the catalytic combustor 2. This compressed gas G2 is burned by a catalytic reaction with the catalyst such as, for example, platinum or palladium within the catalytic combustor 2 to produce a high temperature and high pressure combustion gas G3. This combustion gas G3 is then supplied to the turbine 3 to drive the latter.

The turbine 3 is drivingly connected with the compressor 1 through a rotary shaft 5 and, therefore, the compressor 1 is driven by this turbine 3. In this way, a power generating apparatus 50 including the gas turbine engine GT and the rotating machine 4 is formed. Here, the fuel concentration (concentration of the combustible component) in the working gas G1, in which only the VAM medium is used, is lower than a combustible concentration limit even at a temperature after it has been boosted as a result of the compression made by the compressor 1, and, therefore, it is not ignited in the compressor 1. Also, even in the case in which the CMM medium having a high concentration of combustible component is added to the working gas G1 consisted of only the VAM medium is used as hereinabove described, the amount of addition thereof is controlled so as to be lower than the combustible concentration limit at the temperature which has been boosted as a result of the compression made by the compressor 1, and therefore it is not ignited.

The gas turbine engine GT referred to above also includes a regenerator (heat exchanger) 6 for heating the compressed gas G2, which is introduced from the compressor 1 to the catalytic combustor 2 by an exhaust gas G4 from the turbine 3, and a warming burner 7 for activating the catalyst by increasing the temperature of the compressed gas G2, flowing into the catalytic combustor 2, at the time of start. This warming burner 7 performs a warming by mixing a warming gas G5, formed by mixing a fuel into an extracted gas G20 which is partially extracted from the compressed gas G2 compressed by the compressor 1 and then subjecting the resultant mixture to a flame combustion, into the exhaust gas G4 supplied from the turbine 3 to the regenerator 6. The warming burner 7 is fluid connected with a gas bleed valve 8 for controlling the amount of the extracted gas G20 to be supplied to the warming burner 7. The exhaust gas G4 flowing outwardly from the regenerator 6 is, after sounds thereof have been reduced by a silencer (not shown), discharged to the outside. The control performed by the gas bleed valve 8 to control the amount of supply of the extracted gas G20 to the warming burner 7 is carried out in response to an output signal from a controller 20.

The fuel supply to the warming burner 7 takes place while the flow of the CMM medium, supplied from a CMM source 13 such as a drilled portion in a coal pit, is controlled by a first fuel flow control valve 9. The flow adjustment of the CMM medium performed by the first fuel flow control valve 9 is carried out by the controller 20. The supply of the working gas G1 towards the compressor 1 is accomplished by admixing the CMM medium, extracted from the CMM source 13, into the VAM medium from a VAM source 12 such as, for example, a ventilation in the coal pit, according to the need, while the flow thereof is adjusted by a second fuel flow control valve 10. The CMM medium contains a methane gas in a quantity within the range of about 10 to 30% whereas the VAM medium contains methane in a quantity smaller than 1%. The flow adjustment of the CMM performed by the second fuel flow control valve 10 is also carried out by the controller 20. A suction passage extending from the VAM source 12 to the compressor 1 is fluid connected with an air source 19 such as, for example, an outside air through a shunt valve (open/close) 18 for the purpose of purging that takes place at the time of start of the operation.

The rotary shaft 5 that connects between the compressor 1 and the turbine 3 is comprised of a single shaft, and this rotary shaft 5 is drivingly connected with the rotating machine 4 through a reduction gear unit 17. The electric power obtainable by the rotating machine 4 driven by the rotation of the turbine 3 is inputted to the controller 20. An electric power converting device 11 drives, as a starter motor, the rotating machine 4 at the time of start by means of the controller 20.

Figure 2:
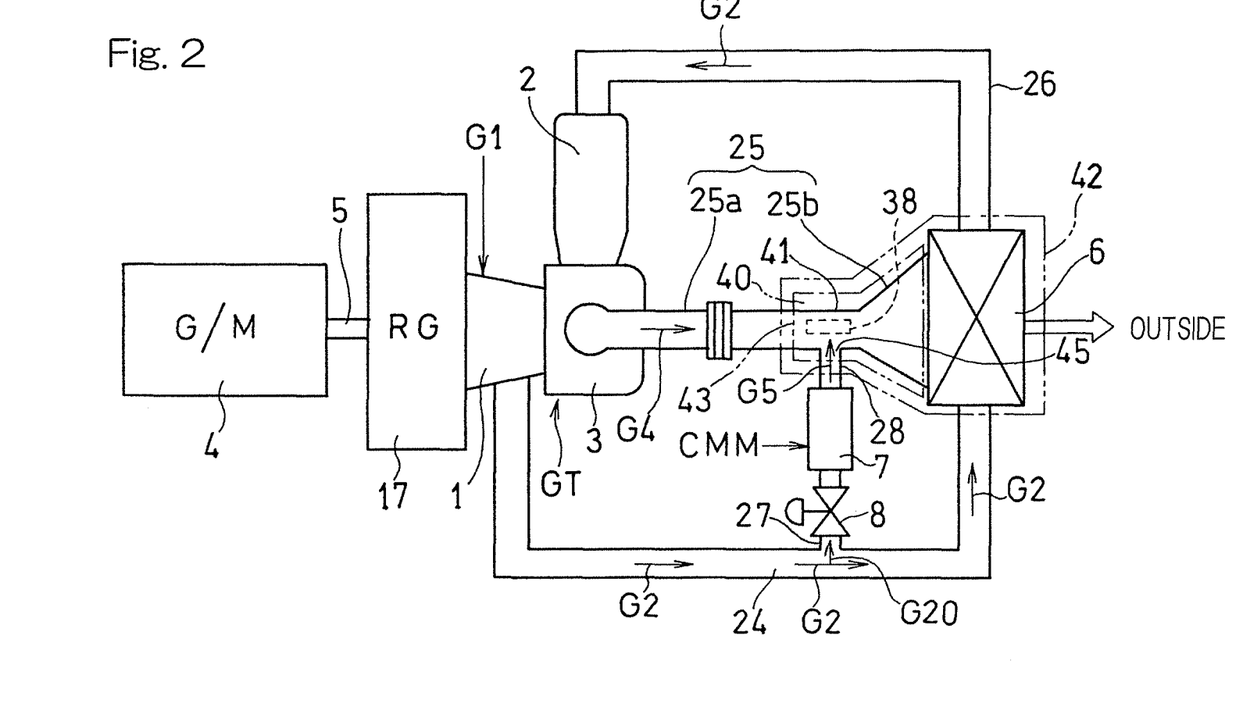
FIG. 2 is a schematic structural diagram showing the layout of major component parts of the gas turbine system shown in FIG. 1.

As best shown in FIG. 2, the turbine 3 and the regenerator 6 are fluid connected together through a tubular exhaust duct 25. This tubular exhaust duct 25 is made up of a hollow cylindrical body 25a, positioned adjacent the turbine 3, and a flared body 25b fluid connected with a downstream end of the hollow cylindrical body 25a and so shaped as to flare towards the regenerator 6, that is, towards a downstream side. The flared body 25b has its upstream end portion representing a circular sectional shape, a downstream end portion representing a rectangular shape having its longitudinal axis lying vertically, and a substantially intermediate portion lying between the upstream end portion and the downstream portion. The intermediate portion of the flared body 25b has a hollow defined therein so as to have a varying sectional shape over the length thereof, which changes gradually from a round shape to a rectangular shape. It is, however, to be noted that the downstream end portion of the flared body 25b may have a round sectional shape.

The hollow cylindrical body 25a of the exhaust duct 25 referred to above forms a first tubing with which is connected a second tubing 28 extending from the warming burner 7 for supplying the warming gas G5 into the exhaust duct 25. The hollow cylindrical body 25a has a rear portion, and a mixing promotion body 38, which is of a tubular shape, specifically a hollow cylindrical shape in this example, is disposed inside of the rear portion of the hollow cylindrical body 25a with its longitudinal axis C1 (best shown in FIG. 3) lying parallel to the direction in which the exhaust gas G4 flows.

As previously discussed, the warming burner 7 is supplied with the CMM medium, which is a fuel component, from the CMM source 13 (best shown in FIG. 1). A extracted gas passage 27 is branched off from a compressed gas passage 24 through which the compressed gas G2 is supplied from the compressor 1 to the regenerator 6, and the warming burner 7 and the gas bleed valve 8 positioned upstream of the warming burner 7 are provided in this extracted gas passage 27. A portion of the extracted gas passage 27 downstream of the warming burner 7 is formed as the second tubing 28 referred to hereinabove.

Figure 3:
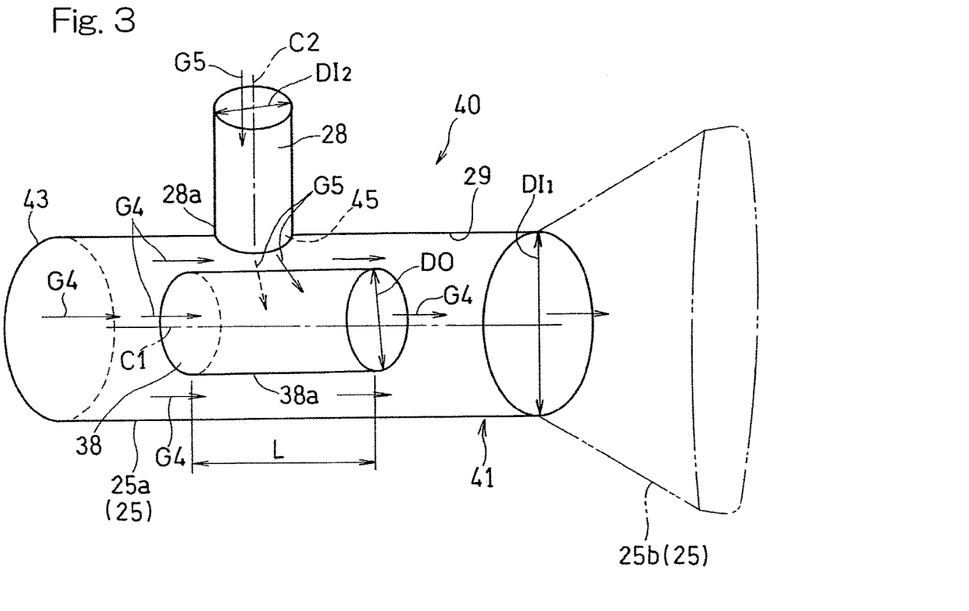
FIG. 3 is a schematic structural diagram showing the fluid mixer.
Figure 4:
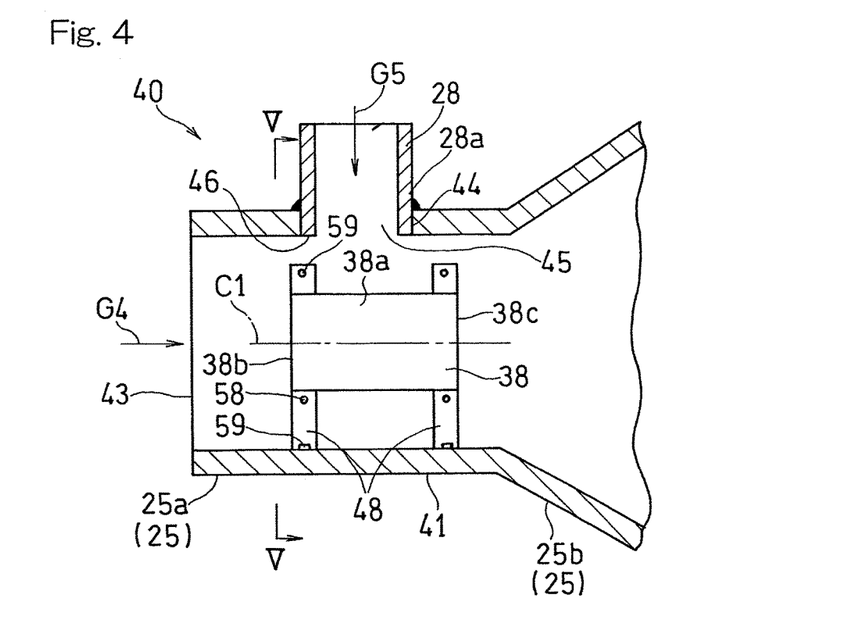
FIG. 4 is a schematic sectional view showing a support structure for the fluid mixer.

Referring now to FIGS. 3 and 4, the details of a fluid mixing device 40 will be described. The fluid mixing device 40 is constituted by a portion of the exhaust duct 25, the mixing promotion body 38 and a downstream portion of the second tubing 28. A main body 41 of the fluid mixing device 40 is constituted by a downstream portion of the first tubing (hollow cylindrical body) 25a, which is a portion of the exhaust duct 25, and the flared body 25b. A first inflow port 43 is provided in an upstream end portion of the main body 41 and a second inflow port 45 communicated with the second tubing 28 is provided in a peripheral wall of the main body 41. As shown in FIG. 2, the fluid mixing device 40 and the regenerator (heat exchanger) 6 disposed downstream of the fluid mixing device 40 cooperate with each other to define a heat exchange system 42.

Figure 10:
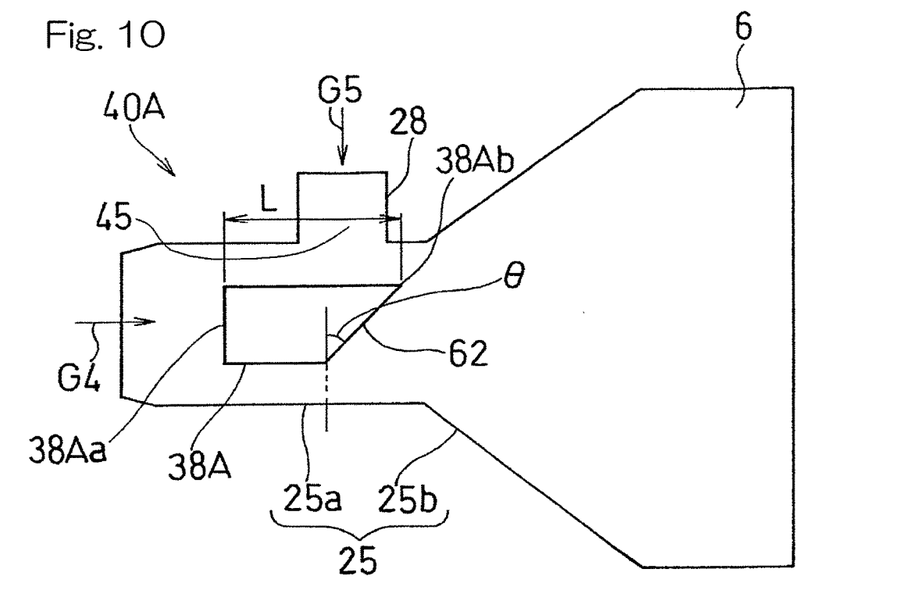
FIG. 10 is a schematic structural diagram showing the fluid mixer designed in accordance with a second preferred embodiment of the present invention.

As best shown in FIG. 3, the exhaust gas G4, which is a first fluid flowing inside the exhaust duct 25, flows into the main body 41 through the first inflow port 43 and passes through both of the inside and outside of the mixing promotion body 38. The mixing promotion body 38 is disposed coaxially with the hollow cylindrical body 25a. Although in the embodiment now under discussion the mixing promotion body 38 is shown as having a hollow cylindrical shape, any hollow member having any suitable shape, for example, a polygonal columnar shape, a conical shape or a polyangular conical shape, or the mixing promotion body 38 may have a downstream end face which may be radially inclined (as shown in FIG. 10 which will be mentioned later).

The second tubing 28 is welded to the hollow cylindrical body 25a of the exhaust duct 25 so as to lie at right angle thereto. The warming gas G5, which is a second fluid from the second tubing 28, flows into the main body 41 through the second inflow port 45, defined by a downstream end edge 46 (best shown in FIG. 4) of the second tubing 28, so as to impinge against an outer peripheral surface 38a of the mixing promotion body 38. The warming gas G5 after having impinged against the outer peripheral surface 38a of the mixing promotion body 38, while guided by and along the outer peripheral surface 38a of the mixing promotion body 38, flows between an inner peripheral surface 29 of the hollow cylindrical body 25a of the exhaust duct 25 and the outer peripheral surface 38a of the mixing promotion body 38a. The exhaust gas G4, which is the first fluid, has a temperature lower than that of the warming gas G5, which is the second fluid.

The mixing promotion body 38 is disposed with its outer peripheral surface 38a confronting the second inflow port 45 so that the warming gas G5, which is the second fluid, from the second tubing 28 may impinge thereupon. As FIG. 4 makes it clear, in the axial direction of the mixing promotion body 38, the second inflow port 45 in its entirety, which is formed in the second tubing 28, overlaps an outer peripheral surface 38a of the mixing promotion body 38, when viewed from side, in a direction axially of the mixing promotion body 38. In other words, the second inflow port 45 is positioned between an upstream end edge 38b and a downstream end edge 38c of the mixing promotion body 38.

The mixing promotion body 38 shown in FIG. 3 has an outer diameter DO which is within the range of about 0.35 to 0.55 times, preferably within the range of 0.4 to 0.5 times, the inner diameter $DI_1$ of the hollow cylindrical body 25a. Also, in order to suppress a fluid flow resistance of the exhaust gas G4, the mixing promotion body 38 has a wall thickness which is preferably as small as possible, provided that the strength is retained. In addition, the diameter DO of the mixing promotion body 38 referred to above is within the range of 0.9 to 1.3 times, preferably 1.0 to 1.2 times, the inner diameter $DI_2$ of the second tubing 28. The mixing promotion body 38 has a length L which is within the range of about 1.2 to 3.0 times, preferably 1.5 to 2.5 times, the inner diameter $DI_2$ of the second tubing 28.

As shown in FIG. 4, the hollow cylindrical body 25a of the exhaust duct 25 and the second tubing 28 are connected together at a joint 44, and an end edge 46 of an outlet portion 28a of the second tubing 28 at the joint 44 is substantially in flush with the inner peripheral surface 29 of the hollow cylindrical body 25a of the exhaust duct 25. It is, however, to be noted that the downstream end edge 46 of the second tubing 28 may be disposed at a location somewhat spaced a distance radially outwardly of the inner peripheral surface 29 of the hollow cylindrical body 25a.

Figure 5:
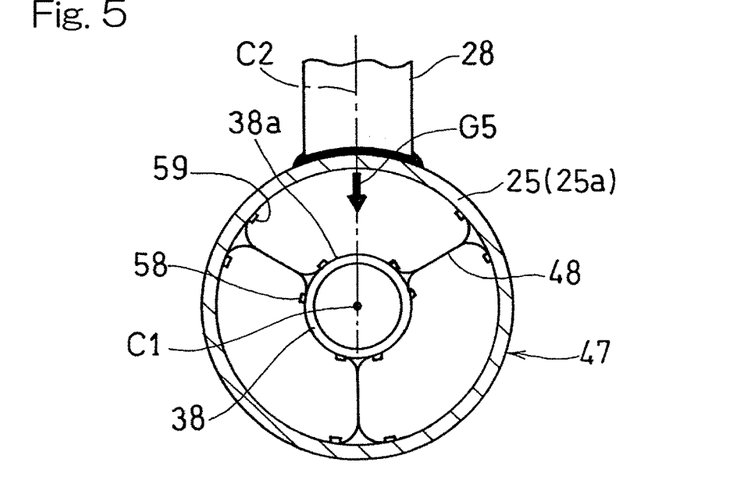
FIG. 5 is a cross sectional view taken along the line V-V in FIG. 4.

As shown in FIG. 5, the second tubing 28 has a longitudinal axis C2 that extends at right angle to the longitudinal axis C1 of the mixing promotion body 38. Accordingly, the warming gas G5 flowing through the second tubing 28 impinges upon a vertex and its adjacent area of the mixing promotion body 38. The mixing promotion body 38 is supported by the hollow cylindrical body 25a of the exhaust duct 25 through a support member 48 that extends a radial direction thereof. The support member 48 is provided at end portion to the mixing promotion body 38 that are opposed to each other in a direction parallel to the longitudinal axis C1 as best shown in FIG. 4. The support member 48 at each of the opposite end portions of the mixing promotion body 38 has an inner end portion fixed to the outer peripheral surface of the mixing promotion body 38 by means of a first fastening member 58 such as, for example, a bolt and also has an outer end portion connected with the inner peripheral surface of the exhaust duct 25 by means of a second fastening member 59 such as, for example, a bolt.

One of the support members 48, for example, the upstream support member 48 disposed on an upstream side with respect to the direction of flow in the exhaust duct 25 in this example, is rigidly (immovably) supported in a direction (axial direction) of flow while the other of the support members 48, for example, the downstream support member 48 disposed on a downstream side with respect to the direction of flow in the exhaust duct 25 in this example, is axially movably supported, so that the thermal expansion of the mixing promotion body 38 in the axial direction can be absorbed. More specifically, the outer end portion of the downstream support member 48 referred to above is provided with a slot having a great length in the axial direction and, with the second fastening member 59 having been inserted through this long slot, the mixing promotion body 38 is supported for movement in the axial direction.

As shown in FIG. 5, each of the support member 48 is made up of a plate member and is provided at three locations circumferentially of the mixing promotion body 38. Each of the support members 48 has its radially inner and outer end portions that are so formed as to be ramified in a circumferential or lateral direction away from each other so that the thermal expansion of the mixing promotion body 38 in a direction radially thereof can be absorbed.

The support structure for the mixing promotion body 38 hereinabove detailed may not be necessarily limited to that shown and described, but may be of any design or configuration provided that the thermal expansion occurring in the mixing promotion body 38 can be absorbed. For example, the mixing promotion body 38 may be supported in a cantilever fashion by means of the support member 48 in the form of a link mechanism that is disposed between the exhaust duct 25 and the mixing promotion body 38 so that the thermal expansion of the mixing promotion body 38 can be absorbed.

The operation of the gas turbine engine GT of the structure hereinabove described will now be described. At the time of start, since the temperature of the catalytic burner 2 shown in FIG. 1 is lower than the activation lower limit temperature or the lowest temperature at which the catalyst in the catalytic combustor 2 can be activated, the temperature of the compressed gas G2 flowing through the regenerator 6, which regenerator 6 is warmed up consequent upon the ignition of the warming burner 7, is increased until it reaches a predetermined temperature at which the catalytic reaction takes place in the catalytic combustor 2.

At this time, as best shown in FIG. 3, the exhaust gas G4 from the turbine 3 and the warming gas G5 from the warming burner 7 are mixed together within the fluid mixing device 40. More specifically, the exhaust gas G4 flows into the main body 41 of the fluid mixing device 40 through the first inflow port 43 and then flows inside and outsides of the mixing promotion body 38. At the same time, after the warming gas G5 flows radially into the main body 41 through the second port 45 to impinge against the outer peripheral surface 38a of the mixing promotion body 38, and thereafter flows between the outer peripheral surface 38a of the mixing promotion body 38 and the main body 41, that is, the inner peripheral surface 29 of the hollow cylindrical body 25a of the exhaust duct 25.

The warming gas G5 flowing between the outer peripheral surface 38a of the mixing promotion body 38 and the inner peripheral surface 29 of the main body 41 is first mixed with the exhaust gas G4 then flowing the outside of the mixing promotion body 38 (i.e., a primary mixing takes place). Since the warming gas G5 collides against the outer peripheral surface 38a of the mixing promotion body 38, it is guided along the outer peripheral surface 38a over the entire area of the main body 41 in directions radially and circumferentially of the main body 41. Accordingly, the mixing of the exhaust gas G4 and the warming gas G5 is promoted. At this time, the entire surface of the mixing promotion body 38 is cooled by the low temperature exhaust gas G4 then flowing the inside of the mixing promotion body 38.

Thereafter, a mixed gas, which is a gas formed by the exhaust gas G4 and the warming gas G5 so mixed together during the primary mixing referred to above, is further mixed at a location downstream of the mixing promotion body 38 with the exhaust gases G4 having flown the inside of the mixing promotion body 38 (i.e., a secondary mixing takes place). With the mixing taking place in two stage as hereinabove described, the mixing of the exhaust gas G4 and the warming gas G5 is further promoted. Also, since the mixed gas having flown through the mixing promotion body 38 flows into and is diffused by the flared body 25b of the main body 41, the mixing is still further promoted.

When the normal or rated running takes place, the temperature of the exhaust gas G4 increases and the compressed gas G2, fed from the compressor 1 best shown in FIG. 1, is heat exchanged with the exhaust gas G4 within the regenerator 6, and, therefore, the compressed gas G2 after having been heat exchanged is elevated in temperature to a value enough to allow the catalytic combustor 2 to be operated. As a result, with the gas bleed valve 8 closed, the operation of the warming burner 7 is halted. Accordingly, in the fluid mixing device 40 best shown in FIG. 3, only the exhaust gas G4 flows and no warming gas G5 is introduced. That is to say, only the exhaust gas G4 flows the inside and outside of the mixing promotion body 38. At this time, since the mixing promotion body 38 is so shaped and so configured to have the longitudinal axis C1 that extends in a direction parallel to the direction of flow of the exhaust gas G4, the resistance which the exhaust gas G4 may receive from the mixing promotion body 38 is sufficiently low. Accordingly, during the normal running that takes place the maximum length of operating time, the pressure loss of the exhaust gas G4 can be effectively suppressed.

In the construction hereinabove described, as shown in FIG. 3, since the mixing promotion body 38 having its longitudinal axis C1 extending in the direction conforming to the direction of flow of the exhaust gas G4 is disposed on the inside of the main body 41 and the exhaust gas G4 flows the outside and the inside of the mixing promotion body 38 in a direction parallel to the longitudinal axis C1 of the mixing promotion body 38, the pressure loss of the exhaust gas G4 is suppressed. Also, as the warming gas G5 is introduced towards the outer peripheral surface 38a of the mixing promotion body 38, the warming gas G5 collides against the outer peripheral surface 38a to flow in respective directions radially and circumferentially of the main body 41. As a result, at the outside of the mixing promotion body 38 the exhaust gas G4 and the warming gas G5 are sufficiently mixed together. The warming gas G5, after having been mixed with the exhaust gas G4 then flowing the outside of the mixing promotion body 38, is again mixed with the exhaust gas G4 having flown the inside of the mixing promotion body 38 and, therefore, the mixing of the exhaust gas G4 and the warming gas G5 is promoted. Also, since the mixing promotion body 38 is disposed in the inside of the main body 41 and the second inflow port 45 for introducing the warming gas G5 in a direction towards the mixing promotion body 38 is merely disposed, the structure is simple.

Also, since the mixing promotion body 38 is disposed substantially coaxially with the main body 41, the distance between the second inflow port 45 and the mixing promotion body 38 becomes constant regardless of the position at which the second inflow port 45 is defined in a direction circumferentially of the main body 41. Therefore, the accuracy in positional relation between the second inflow port 45 and the mixing promotion body 38 is no longer required and, hence, the manufacture can become easy.

In addition, since the second tubing 28 is connected with the exhaust duct 25 so as to lie substantially at right angle to the latter, the warming gas G5 impinges against the outer peripheral surface 38a of the mixing promotion body 38 in a direction at right angles thereto and, therefore, the warming gas G5 flows in respective directions radially and circumferentially of the exhaust duct 25 or the main body 41. As a result, the mixing of the exhaust gas G4 and the warming gas G5 is further promoted.

As best shown in FIG. 4, since the end edge 46 of the second tubing 28 at the joint 44 between the exhaust duct 25 and the second tubing 28 is in flush with the inner peripheral surface 29 of the exhaust duct 25, the flow of the exhaust gas G4 then flowing through the exhaust duct 25 is not disturbed by the second tubing 28 and, therefore, the pressure loss of the exhaust gas G4 is further suppressed.

Yet, since the temperature of the exhaust gas G4 is lower than that of the warming gas G5, the entire surface of the mixing promotion body 38 that contacts the warming gas G5 of a high temperature is cooled by the exhaust gas G4. Hence, there is no need to use any structure required to avoid an overheating of the mixing promotion body 38 and the structure further becomes simple.

As shown in FIG. 3, since a downstream portion of the main body 41 is formed by the flared body 25b having a passage surface area that increased towards the downstream direction, the mixed gas of the exhaust gas G4 and the warming gas G5 is diffused by the flared body 25b and the mixing is further promoted.

As shown in FIG. 2, since the fluid mixing device 40 is disposed at a location upstream of the regenerator 6 which is the heat exchanger, after the exhaust gas G4 and the warming gas G5 have been sufficiently mixed together by the fluid mixing device 40, the mixed gas is introduced into the regenerator 6. Therefore, the temperature distribution in the section for crossing the flow of the mixed fluid is uniformized and, consequently, the heat exchange efficiency increases.

In order to ascertain the mixing condition in the fluid mixing device 40 according to the above described embodiment, a series of computer analyses were conducted. Also, as a comparative example, the structure which does not make use of the mixing promotion body 38 employed in the fluid mixing device 40 according to the foregoing embodiment was similarly analyzed.

Figure 6:
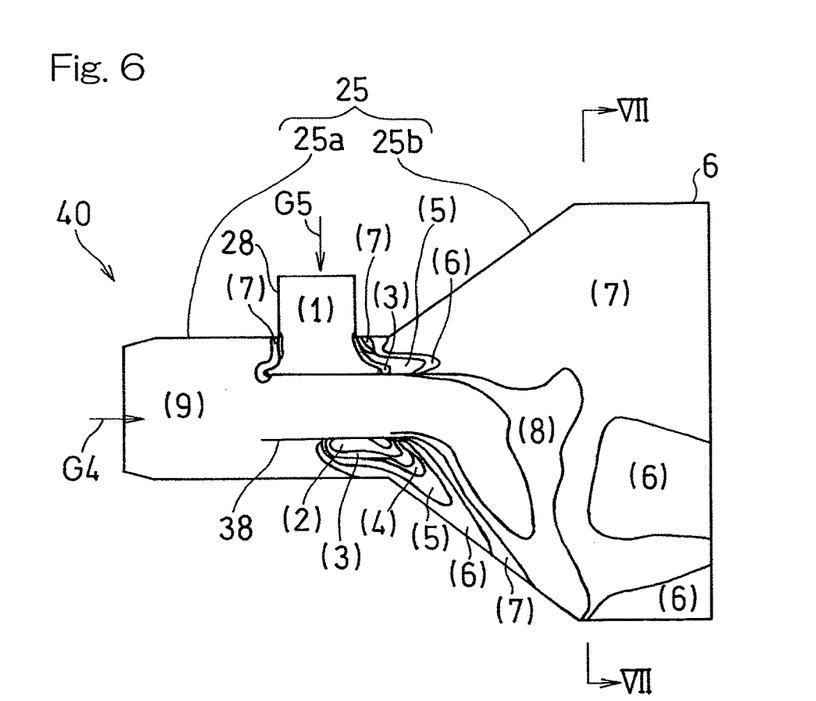
FIG. 6 is a diagram showing a temperature distribution in an axial direction of the fluid mixer.
Figure 7:
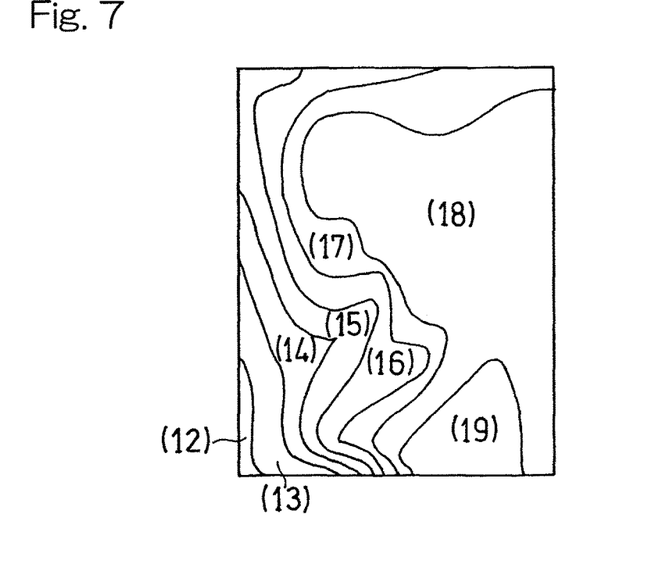
FIG. 7 is a diagram showing a temperature distribution in a radial direction, which appears at a site of an inlet to a regenerator connected with the fluid mixer.
Figure 8:
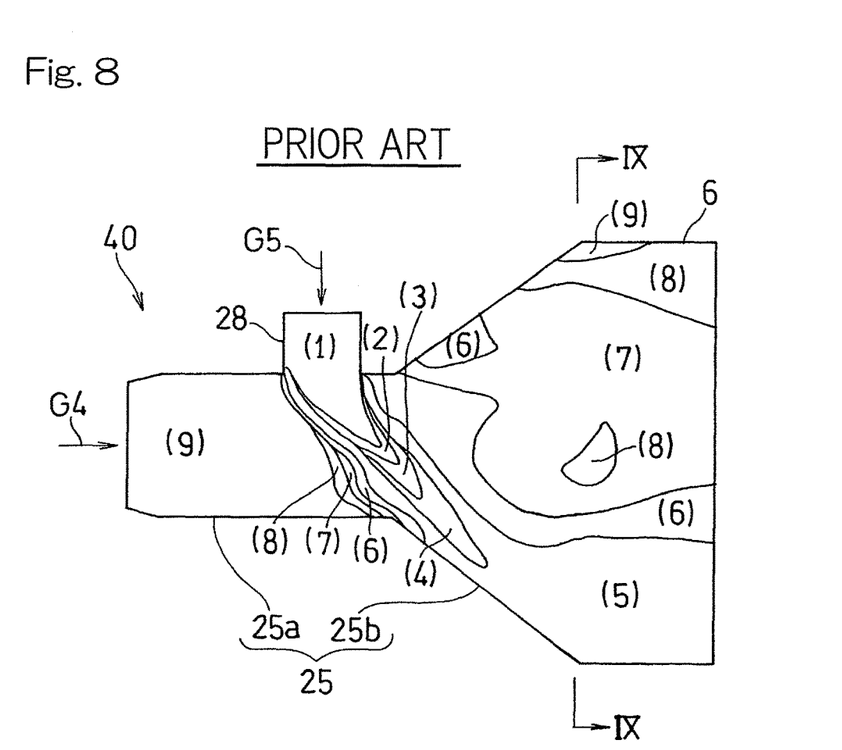
FIG. 8 is a diagram showing a temperature distribution in an axial direction, which is exhibited by a conventional fluid mixer.
Figure 9:
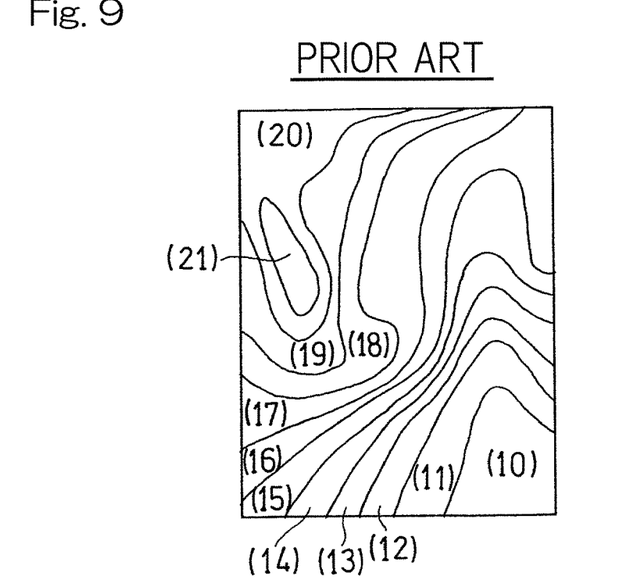
FIG. 9 is a diagram showing a temperature distribution in the radial direction, which appears at the site of an inlet to the regenerator connected with the conventional fluid mixer.

FIG. 6 illustrates a temperature distribution in the axial direction, which was exhibited when using the fluid mixing device 40 according to the foregoing embodiment to mix the exhaust gas G4 with the warming gas G5, FIG. 7 illustrates a temperature distribution in the radial direction exhibited on the cross sectional view, taken along the line VII-VII in FIG. 6, that is, at a site of an exit of the fluid mixing device 40. FIGS. 8 and 9 illustrate respective temperature distributions exhibited by the comparative example. In the following figures, numbers with parentheses (1) to (21) represent respective regions ranging from a high temperature to a low temperature. In FIGS. 6 and 8, the same numbers of (1) to (9) represent the same temperature regions. Similarly, in FIGS. 7 and 9, the same numbers of (10) to (21) represent the same temperature regions.

As shown in FIG. 6, with the fluid mixing device 40 according to the foregoing embodiment, the warming gas G5 of a high temperature spreads from a center portion to a lower portion of the flared body 25b and, as a result, it is readily understood that as shown in FIG. 7, at the site of exit of the fluid mixing device 40, the temperature distribution is uniformized and, hence, the both gases are properly mixed together. On the other hand, with a fluid mixing device according to the comparative example, as shown in FIG. 8, the warming gas G5 of a high temperature massively flow into a lower portion of the flared body 25*b* and, as a result, as shown in FIG. 9, the temperature distribution is biased at the site of exit of the fluid mixing device 40 with the both gases insufficiently mixed together.

FIG. 10 illustrates a schematic structural diagram of the fluid mixing device 40A designed in accordance with a second preferred embodiment of the present invention. The fluid mixing device 40A according to the second embodiment differs from the fluid mixing device 40 according to the previously described embodiment only in that in the downstream end face 62 of the mixing promotion body 38A which is, according to the second embodiment, so shaped as an end face inclined upwardly in a direction towards the downstream side. Other structural features are similar to those shown and described in connection with the previously described first embodiment. In other words, a downstream end portion (lower portion) of the mixing promotion body 38, which is opposite to a portion (upper portion) thereof that confronts the second tubing 28, is cut to incline. Although in this example, the angle of inclination θ of the lower end face 62 relative to the radial direction is shown as 45°, this angle of inclination θ may be set to a value within the range of about 20 to 60° and preferably within the range of about 30 to 50°. The second inflow port 45 is located between an upstream end edge 38Aa of the mixing promotion body 38A and a downstream end edge 38Ab of a portion (upper portion shown in FIG. 10) that confronts the second inflow port 45.

Figure 11:
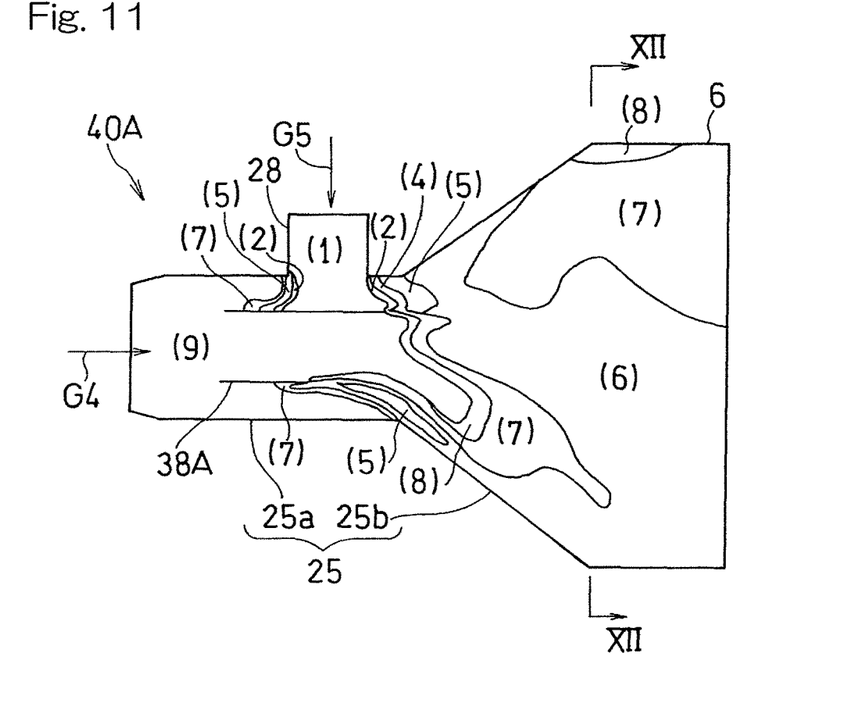
FIG. 11 is a diagram showing a temperature distribution in the axial direction, which is exhibited by the fluid mixer shown in FIG. 10.
Figure 12:
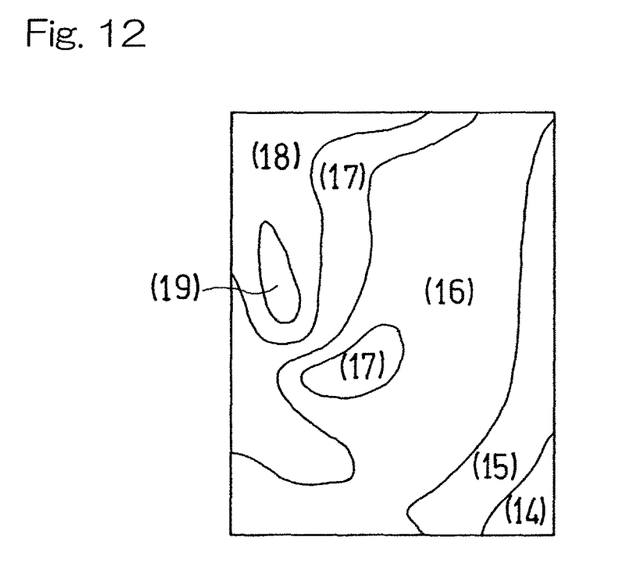
FIG. 12 is a diagram showing a temperature distribution in the radial direction, which appears at the site of the inlet to the regenerator connected with the fluid mixer shown in FIG. 10.

Even with the fluid mixing device 40A according to the second embodiment, as is the case with the fluid mixing device 40 according to the previously described first embodiment, verification was made by means of a series of computer analyses. Results thereof are shown in FIGS. 11 and 12. As can readily be understood from FIG. 11, with the fluid mixing device 40A designed according to the second embodiment, a still larger quantity of the warming gas G5 of a high temperature flows in the vicinity of a center portion of the flared body 25*b* and, accordingly, as can readily be understood from FIG. 12, the temperature distribution is further uniformized as compared with that exhibited by the fluid mixing device 40 according to the previously described first embodiment.

Although in describing any one of the first and second embodiments a downstream portion of the hollow cylindrical body 25*a* forming an upstream portion of the main body 41 has been shown and described as representing the hollow cylindrical shape, it may be a flaring tube of a kind having a small tapering ratio somewhat flaring in a direction towards the downstream side. Also, where the tapering ratio of the flared body 25*b* of the main body 41 is small, the mixing promotion body 38 may be disposed within the inside of the flared body 25*b*. In addition, with the flared body 25*b* omitted, the entire main body 41 of the fluid mixing device 40 may be so shaped as to have a cylindrical shape. Yet, the second inflow port 45 may be provided in a plural number so that different fluids can be introduced into the main body 41 through the respective inflow ports 45.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

6 . . . Regenerator (Heat exchanger)
25 . . . Exhaust duct
28 . . . Second tubing
29 . . . Inner peripheral surface of the main body
38, 38A . . . Mixing promotion body
38*a* . . . Outer peripheral surface of the mixing promotion body
40, 40A . . . Fluid mixing device
41 . . . Main body (First tubing)
42 . . . Heat exchange system
43 . . . First inflow port
44 . . . Joint
45 . . . Second inflow port
46 . . . End edge of the second tubing
C1 . . . Longitudinal axis
G4 . . . Exhaust gas (First fluid)
G5 . . . Warming gas (Second fluid)

What is claimed is:

1. A fluid mixing device which comprises:
a hollow tubular main body to mix first and second fluids within it;
a first inflow port provided in an upstream end portion of the main body and through which the first fluid flows;
a mixing promotion tube disposed inside the main body and having a longitudinal axis extending in a direction conforming to a direction of flow of the first fluid, the mixing tube also having its opposite ends left open; and
a second inflow port provided in a peripheral wall of the main body and through which the second fluid flows towards an outer peripheral wall of the mixing tube and flows circumferentially about substantially the entire outer peripheral wall of the mixing tube between the outer peripheral wall and the peripheral wall of the main body,
wherein the mixing tube is disposed in substantially coaxial relation with the main body,
wherein the first fluid, introduced into the main body through the first inflow port, flows inside and outside of the mixing tube,
wherein the first fluid, which flows outside of the mixing tube, is first mixed with the second fluid, which is introduced into the main body through the second inflow port, to produce a primary mixed gas,
wherein the primary mixed gas is further mixed at a location downstream of the mixing tube with the first fluid which flows inside of the mixing tube to produce a secondary mixed gas, and
wherein the mixing tube is defined by the outer peripheral wall configured to prevent the second fluid from flowing therethrough into an interior of the mixing tube.

2. The fluid mixing device as claimed in claim 1, further comprising a first tubing, which forms the main body, and a second tubing, which is fluid connected with the first tubing so as to lie at right angle to the first tubing, the second tubing operable to supply the second fluid therethrough to the second inflow port.

3. The fluid mixing device as claimed in claim 1, further comprising a first tubing, which forms the main body, and a second tubing, which is fluid connected with the first tubing, wherein at a joint between the first tubing and the second tubing, an end edge of the second tubing is disposed in flush with or radially outwardly of an inner peripheral surface of the first tubing.

4. The fluid mixing device as claimed in claim 1, in which the first fluid is of a temperature lower than the second fluid.

5. The fluid mixing device as claimed in claim 1, in which the main body has a downstream portion, the downstream portion of the main body being defined by a flared body having its passage surface area that increases in a downstream direction.

6. A heat exchange system in which the fluid mixing device as defined in claim 1 is disposed upstream of a heat exchanger.

7. The fluid mixing device as claimed in claim 1, wherein the mixing tube is held coaxially within the main body by a plurality of support members extending radially from an inner circumference of the main body to an outer circumference of the mixing tube.

8. The fluid mixing device as claimed in claim 7, wherein the plurality of support members are bolted to the inner circumference of the main body and to the outer circumference of the mixing tube.

9. The fluid mixing device as claimed in claim 7, wherein the mixing tube is separated from the second inflow port,
wherein the second inflow port comprises an opening at the peripheral wall, and
wherein the opening faces the outer circumference of the mixing tube.

10. The fluid mixing device as claimed in claim 9, wherein the opening opens the second inflow port to an interior of the main body at the peripheral wall and is configured to direct the second fluid such that the second fluid flows from the opening and through the interior of the main body, at which the first fluid is partly directed therethrough, and to an outermost portion of the mixing tube such that the second fluid impinges the outermost portion at a right angle.

11. The fluid mixing device as claimed in claim 1, wherein the second inflow port opens at the peripheral wall of the main body.

12. The fluid mixing device as claimed in claim 1, wherein the outer peripheral wall is an outermost portion of the mixing tube and is facing an inner wall of the main body.

\* \* \* \* \*